3,024,860
OFF-THE-ROAD MOTORCYCLE
Theodore R. Nicolai, 26598 Base Line, Highland, Calif.
Filed Mar. 28, 1960, Ser. No. 17,945
7 Claims (Cl. 180—32)

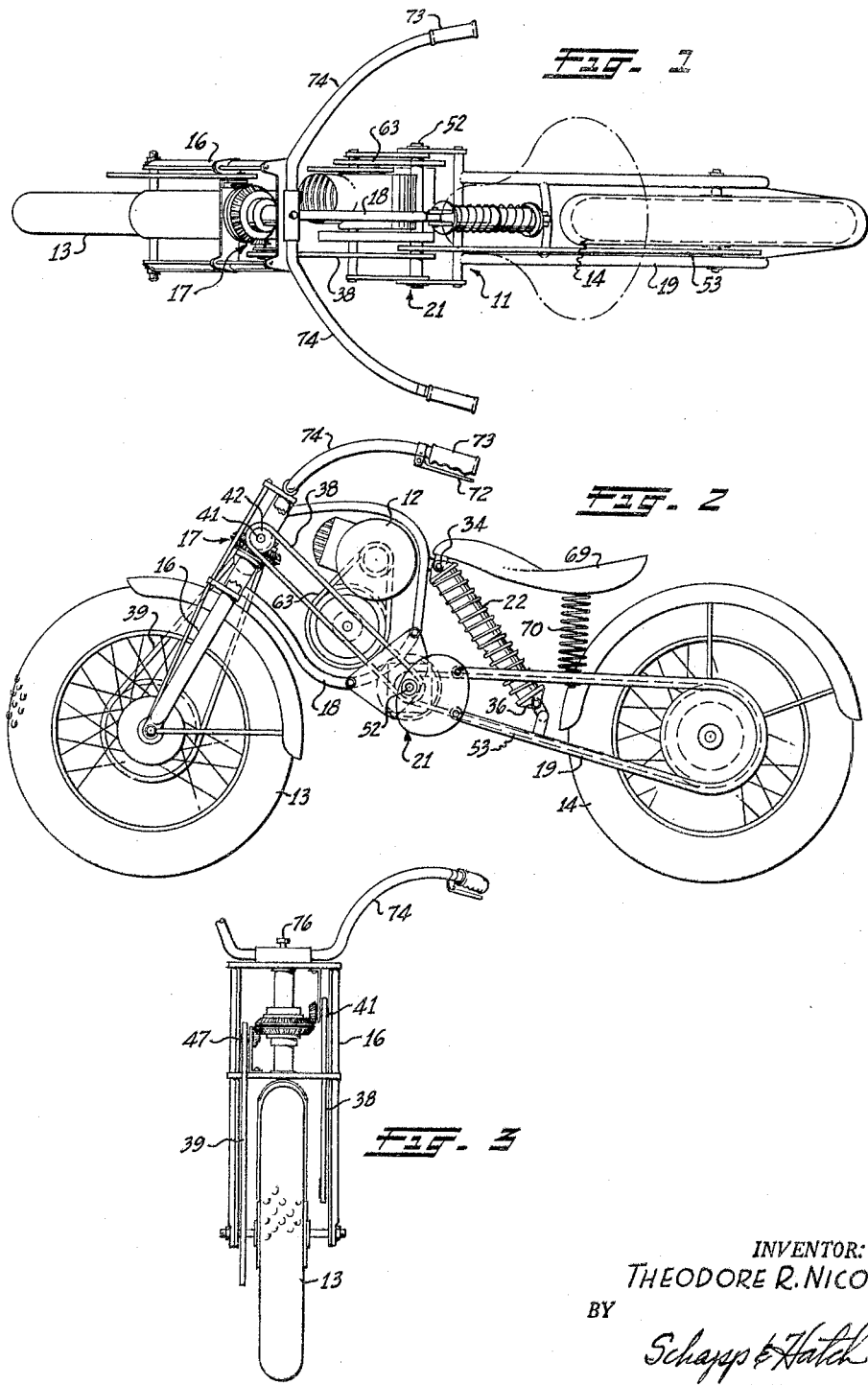

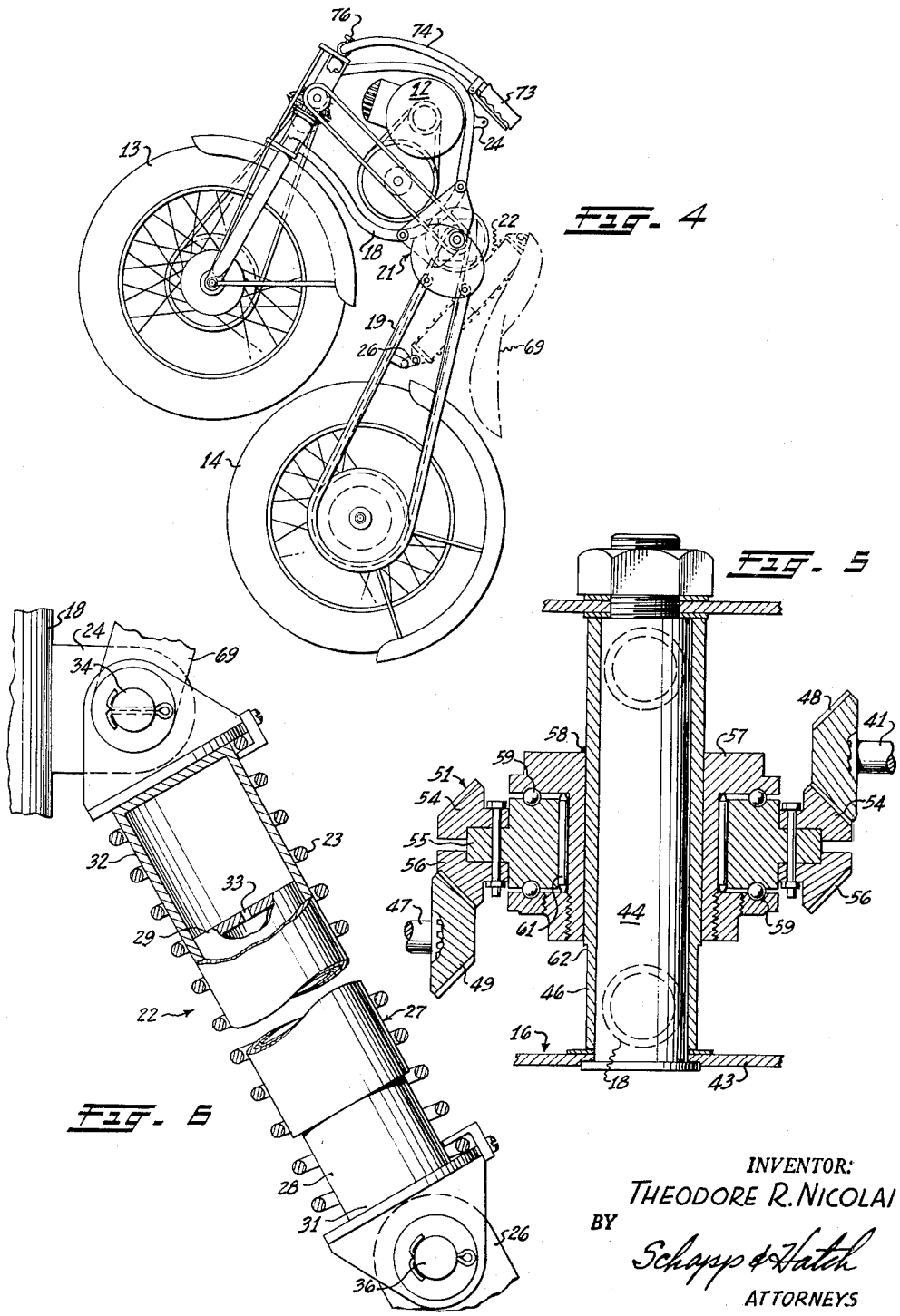

This invention relates to improvements in an off-the-road motorcycle, and more particularly to vehicles intended for use in rough and mountainous territory where roads and trails are not always available.

The four-wheel drive jeep has proved to be invaluable in daily use in such terrain but, because of its four wheels, its use is limited to situations where there is sufficient clearance to accommodate the width of a four wheel chassis. This often requires long detours, and sometimes makes the country impassable.

The present invention contemplates a motor bike having characteristics making it practical for use in almost any territory, no matter how rough. Traction is one of the prime prerequisites, and I have provided maximum traction through the use of a novel chain drive which supplies power to both wheels. The wheels, and indeed the whole bike, are designed for maximum tractive efficiency under all conceivable conditions of use.

The various components are designed and arranged for ease of operation and handling under extremely adverse conditions, and are organized to provide a minimum frontal area so as to allow the unit to pass between closely set trees or rocks.

Cooperating with the other structural features is a novel suspension which eases the ride materially, while being rugged enough for the hard usage to which the vehicle will be put. The suspension, the drive, and the other working parts are designed for rugged, trouble-free operation in locations remote from repair and service facilities and, if repair should be needed, the design permits such repair with simple tools.

Accordingly, it is a principal object of the present invention to provide a two-wheeled vehicle adapted to use in otherwise inaccessible areas, the vehicle being adapted to travel in nearly all places where pack animals could go.

Another object of the present invention is to provide a two-wheeled off-the-road vehicle in which both wheels are driven simultaneously and at the same speed by a novel chain drive and front wheel drive connection.

A further object of the invention is to provide a vehicle of the character described including an articulated suspension particularly adapted for cushioning the shocks and jolts encountered over rough terrain, and which permits easy folding of the frame to effect a saving in space required for transporting the vehicle.

A still further object of the invention is the provision of a front wheel drive which transmits power evenly to the front wheel at all pivotal positions thereof, the structure of the connection permitting its effective use with chain and sprocket drives from the engine and to the front wheel.

Another object of the invention is to provide a novel arrangement of driving elements, in a vehicle of the type described, which is inherently balanced and which results in a narrow unit adapted to travel between trees or rocks set too closely together to pass larger vehicles.

Additionally, it is proposed to provide an off-the-road vehicle of the character described, which is light-weight, but sturdy, having a high strength to weight ratio, and which is easy to service and maintain under unfavorable conditions.

Further objects and advantages of my invention will appear as the specification proceeds, and the new and useful features of the same will be fully defined in the claims hereto attached.

The preferred form of the invention is illustrated in the accompanying drawings forming part of this application, in which:

FIGURE 1 shows a plan view of a vehicle constructed in accordance with the present invention;

FIGURE 2, a side elevational view of the vehicle of FIGURE 1;

FIGURE 3, a front elevational view of the vehicle;

FIGURE 4, a side elevational view of the vehicle of FIGURE 1, shown in folded position;

FIGURE 5, a cross-sectional view, on an enlarged scale, of drive gearing on the front fork; and FIGURE 6, an enlarged detail view, partially in section, of a resilient means forming part of the vehicle of FIGURE 1.

While I have shown only a preferred form of my invention, I wish to have it understood that various changes or modifications may be made within the scope of the claims attached hereto, without departing from the spirit of the invention.

Referring to the drawings in detail, it will be seen that the vehicle of the present invention consists basically of a frame 11, an engine 12 mounted on the frame, and front and back wheels 13 and 14 journaled in a swingable fork 16 and the rear end of the frame, respectively. Also included in the vehicle is a novel drive means 17 operatively connecting the wheels 13 and 14 to the engine 12 for rotation thereby so as to provide two-wheel drive.

As here shown, the frame 11 is articulated, that is, it includes a front section 18 and a rear section 19 joined together by a hinged connection 21. The hinge is positioned somewhat forward of midway between the wheels and is formed so that weight on either frame section tends to depress the hinge toward the ground.

Yieldably resisting this tendency is a resilient means 22, here shown as mounted between confronting portions of the frame sections 18 and 19 in spaced relation to the hinge 21. The resistance to displacement of the means 22 is such that the frame will sag slightly, whenever a bump is encountered, and will thereafter rise back to a balanced or stabilized position.

A suitable resilient means is illustrated in FIGURE 6 of the drawings. As here shown, a helical spring 23 is mounted between hangers 24 and 26 secured on the front and rear frame sections 18 and 19. The spring compresses to allow the frame sections to move together as excess loads are imposed and urges the sections back to their original positions when the load is removed.

Shock absorbing means, is provided for damping the spring action so as to prevent a bucking motion of the frame. This means here consists of a telescoping shock absorber 27 mounted within the coils of the spring 23 between the frame sections 18 and 19.

The shock absorber 27 consists of a tubular member 28 secured to frame section 19 and having closed ends 29 and 31, member 28 being mounted to slide axially in an elongated cup-shaped member 32. The interior is filled with a fluid such as oil, and an orifice 33 is formed in end 29. This orifice permits relative telescoping action of the shock absorber, but slows down the action in accordance with the size of the orifice.

The connection of the shock absorber sections 28 and 32 to their respective frame sections 19 and 18 is by bolts 34 and 36, the parts being formed to allow pivotal movement around these bolts.

As an important feature of the invention, the drive means 21 is formed to drive both wheels at the same speed and to transmit full power to the front wheel at all pivotal positions thereof. For the latter purpose, a swivel means is interposed in the drive means 17 at the fork 16.

The swivel means is rotated by a roller chain 38, driven by the engine 12, and imparts this rotation to the front wheel through a roller chain 39. Roller chains are extremely desirable because their self-cleaning action permits their use under conditions where worm gears and similar drives would soon fail.

Chain 38 drives an input shaft 41, which is journaled in an extension of the frame 11, through a sprocket 42. The shaft is positioned with its axis extending horizontally to the ground, and transversely of the length of the frame 11, when the vehicle is upright. This places the shaft 41 in parallel spaced relation to the axis of the hinge 21, for a purpose to be explained subsequently.

The input shaft 41 is located so that its axis intersects the generally upright axis about which the fork pivots for steering the vehicle.

As here shown, the fork 16 is of the bifurcated type having depending legs in which front wheel 13 is journaled. A crossbar 43 connects these legs and is provided with an upright shaft 44 which is journaled in a barrel 46 comprising the forward end of frame 11. The axis of shaft 44 is the pivotal axis of the fork.

Journaled on the fork 16 is an output shaft 47 having a sprocket driving the chain 39. The output shaft is also arranged with its axis parallel to the axis of wheel 13 and perpendicularly intersecting the pivotal axis of the fork 16. Bevel gears 48 and 49 are mounted on the input and output shafts 41 and 47, respectively, and are enmeshed with a bevel gear unit 51 so as to transmit rotation therebetween.

Both of the wheels of the vehicle are driven by a common shaft 52 mounted coaxially within the hinge 21, rear wheel 14 being driven by roller chain 53 while front wheel 13 is driven through chain 38. Because of this structure, it is highly desirable rear output shaft 47 rotates in the same direction as input shaft 41, in order to avoid the necessity of a countershaft or additional gearing.

This is here accomplished by providing the gear unit 51 with gears 54 and 56, which are beveled in opposite directions, and engaging level pinion 48 with gear 54 and bevel pinion 49 with gear 56. With this structure, all driven shafts will revolve in the same direction, greatly simplifying the drive train.

The bevel gear unit 51 is designed for easy replacement should such become necessitated by wear or breakage. The structure is best seen in FIGURE 5 of the drawings wherein a spool-shaped member 57 is slid onto frame barrel 46 and is held in place by a tack weld 58, the spool 57 being formed with races for ball bearings 59 and needle bearings 61 on which gears 54 and 56 and their supporting member 55 may rotate.

For reasons of strength, it is highly desirable that the frame be of all-welded construction and that the barrel 46 be welded to the longitudinal frame members which form frame section 18. Should replacement of the spool 57 become necessary, it would be difficult to grind and file the broken weld of the barrel smoothly enough to allow the close-fitting spool to be slid off. This problem is here avoided by turning down the periphery of the lower end of the barrel 46, as at 62, and welding the lower frame member to the reduced section, see FIGURE 5.

As an important feature of the present invention, the vehicle is quite narrow, and the parts are arranged so that transverse balance is maintained. This balance is here achieved by providing the drive sprocket of the engine on the right side of the bike and connecting it by a chain drive 63 to a sprocket secured to the drive shaft 52. From FIGURE 1 it may be seen that the shaft 52 extends through the hinge 21 so that the chains 38 and 53 are positioned on the left side of the frame.

The entire machine is very light in weight, but at the same time very sturdy so as to take the rugged use to which it is subjected in off-the-road travel. The frame 11 is fabricated from aluminum or stainless steel tubing and the motive means is chosen for light weight and compactness.

The normal speeds at which the vehicle will proceed are quite low and range from 2 to 3 miles per hour, in heavy going, to approximately 35 miles per hour over smooth surfaces. The horsepower requirements, due to the low speeds, are considerably lower than required for high speed road machines, four to five horsepower being entirely adequate for most uses.

This characteristic makes it possible to use an extremely small and light-weight engine such as the aluminum engines commonly used for driving chain saws. These engines are very light, on the order of seven to ten pounds in weight, but produce enough torque to drive the light-weight vehicle at the speed contemplated.

The seat 69 of the vehicle is mounted closer to the ground than the seats of road machines and allows the feet of the rider to always be available for walking the vehicle along at very slow speed and over muddy, gravelly or sandy surfaces. It should be noted that the seat 69 is low enough to permit the rider to stand astride the vehicle when necessary.

Other than this, the vehicle is ridden in substantially the conventional manner, and is preferably provided with conventional brakes and transmission shifting devices manually controlled from levers 72 adjacent to the handgrips 73 on the fork handlebars 74.

As an important feature of the invention, the articulated frame permits the machine to be folded to a more compact size for transportation, as in the trunk of an automobile, to the rugged terrain in which it will normally be used.

As may be seen from FIGURE 4, the frame 11 is folded around the hinge 21 until the wheels 13 and 14 touch. Such folding is simply effected by merely removing pin 34 which pivotally connects the resilient means 22 and seat 69 to the forward frame section 18. This disconnects frame sections 18 and 19 allowing their relative movement to the position shown, seat springs 70 being removed, if desired.

Preferably, the handlebars 74 are secured to the fork 16 by a set screw 76 so that, when the set screw is loosened, the handlebars may be swung down out of the way. This also provides for easy adjustment of the height of the handle bars.

Cooperating with the described characteristics of the vehicle are the wheels 13 and 14 which mount light-weight tires formed with a knobbed tread, the knobs affording excellent traction over a wide variety of surfaces.

From the foregoing it will be seen that I have provided a vehicle which embodies a new concept in machinery adapted for off-the-road transportation, the suspension drive system, power train, and other components all cooperating to produce the first completely practicable vehicle for such purposes.

I claim:

1. In a motor bike having a front fork post journaled in a barrel member attached to the frame of the bike, a swivel connection including a bearing encircling said barrel member in coaxial relation to the fork post, and a gear unit journaled on said bearing, said gear unit having a ring of teeth beveled for engagement with a bevel pinion gear on an input shaft and an oppositely beveled ring of teeth beveled for engagement with a bevel pinion gear on an output shaft, whereby said output shaft will rotate in the same direction as said input shaft.

2. In a motor bike having a front fork post journaled in a barrel member attached to the frame of the bike, a swivel connection including a bearing encircling said barrel member in coaxial relation to the fork post, and a gear unit journaled on said bearing, said gear unit having a ring of teeth beveled for engagement with a bevel pinion gear on an input shaft and an oppositely beveled ring of teeth beveled for engagement with a bevel pinion gear on an output shaft, whereby said output shaft will rotate in the same direction as said input shaft, said bearing including a spool member providing bearing races and formed for tack welding in encircling relation around said barrel member.

3. An off-the-road motorcycle, comprising an articulated frame having front and rear sections of substantially similar length, with a hinged connection between the same centrally of the frame for relative movement about a horizontal transverse axis, resilient means between said sections formed for yieldingly resisting relative movement of the sections on said hinge, an engine mount on the front section, a seat mounted on the rear section, a back wheel journaled on the rear end of the rear section, a fork pivotally mounted at the forward end of the front section to swing about a substantially upright axis, a front wheel journaled on said fork and swingable therewith for steering the vehicle, and drive means for both of the wheels including a drive shaft mounted coaxially with the hinged connection.

4. An off-the-road motorcycle as defined in claim 3 in which the hinged connection is disposed above the plane defined by the axes of the wheels.

5. An off-the-road motorcycle as defined in claim 3, in which the hinged connection is disposed above the plane defined by the axes of the wheels and in which the resilient means is tensioned to exert upward pressure on the hinged connection.

6. An off-the-road motorcycle as defined in claim 3, in which the rear frame section extends substantially horizontally from the hinged connection and the front frame section includes a member rising substantially vertically from the hinged connection, and the resilient means comprises a spring extending diagonally from an intermediate section of the rear frame section to an elevated point of the front frame section.

7. An off-the-road motorcycle as defined in claim 6, in which the spring has shock-absorbing means associated therewith.

References Cited in the file of this patent

UNITED STATES PATENTS

| 1,026,122 | Prather | May 14, 1912 |
| 1,139,622 | Yordi | May 18, 1915 |

FOREIGN PATENTS

| 1,150,961 | France | Aug. 19, 1957 |
| 360,735 | Great Britain | Nov. 12, 1931 |